US008065731B1

(12) United States Patent
Nucci et al.

(10) Patent No.: US 8,065,731 B1
(45) Date of Patent: Nov. 22, 2011

(54) SYSTEM AND METHOD FOR MALWARE CONTAINMENT IN COMMUNICATION NETWORKS

(75) Inventors: Antonio Nucci, San Jose, CA (US); Supranamaya Ranjan, Burlingame, CA (US)

(73) Assignee: Narus, Inc., Sunnyvale, CA (US)

( * ) Notice: Subject to any disclaimer, the term of this patent is extended or adjusted under 35 U.S.C. 154(b) by 721 days.

(21) Appl. No.: 12/165,939

(22) Filed: Jul. 1, 2008

(51) Int. Cl.
*G06F 11/00* (2006.01)
*G06F 12/14* (2006.01)
*H04L 9/32* (2006.01)

(52) U.S. Cl. ............... 726/22; 726/23; 726/24; 726/25; 726/26; 713/187; 713/188

(58) Field of Classification Search ............... 726/22
See application file for complete search history.

(56) References Cited

U.S. PATENT DOCUMENTS

2006/0080422 A1* 4/2006 Huberman et al. .......... 709/223

OTHER PUBLICATIONS

"Can You Infect Me Now—Malware propagation in Mobile Phone Networks"—Chris Fleizach, Nov. 2, 2007.*
Mickens, J.W., and Noble, B.D., "Modeling Epidemic Spreading in Mobile Environments," in: Proceedings of the 4th ACM Workshop on Wireless Security (Cologne, Germany, Sep. 2, 2005), pp. 77-86.
Fleizach, C., et al., "Can You Infect Me Now? Malware Propagation in Mobile Phone Networks," in: Proceedings of the 2007 ACM Workshop on Recurring Malcode (Alexandria VA, Nov. 2, 2007), pp. 61-68.
Cheng, J., et al., "SmartSiren: Virus Detection and Alert for Smartphones," in: Proceedings of the 5th International Conference on Mobile Systems, Applications and Services (San Juan, PR, Jun. 11-13, 2007), pp. 258-271.

* cited by examiner

*Primary Examiner* — Longbit Chai
(74) *Attorney, Agent, or Firm* — Fernandez & Associates, LLP

(57) ABSTRACT

The present invention relates to a method for containing propagation of a malware in a communication network having a plurality of communication nodes. The method steps include obtaining communication statistics from a traffic trace of the communication network, generating a weighted graph from the communication statistics to represent a communication pattern in the communication network, partitioning the weighted graph based on a pre-determined criteria into at least a first sub-graph representing a first portion of the communication network and a second sub-graph representing a second portion of the communication network, identifying a separator vertex from a plurality of vertices of the weighted graph, the separator vertex connecting the first sub-graph and the second sub-graph, the separator vertex representing a separator node of the plurality of communication nodes, and providing a security patch to the separator node for preventing propagation of the malware between the first portion of the communication network and the second portion of the communication network.

14 Claims, 4 Drawing Sheets

(a) Balanced Graph Partitioning (b) Clustered Graph Partitioning

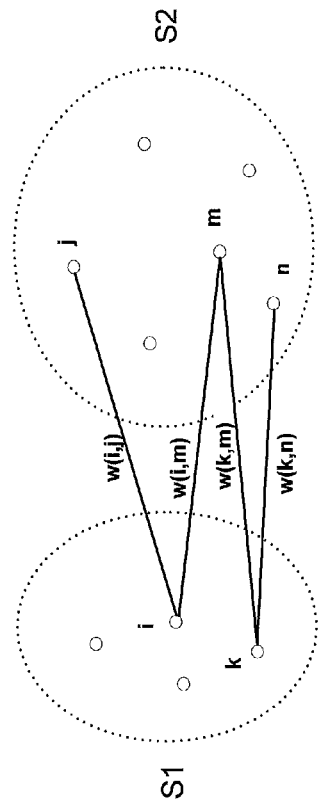
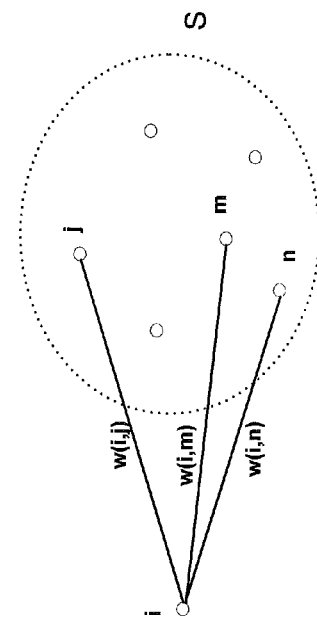
Figure 3A
Figure 3B
Figure 3C
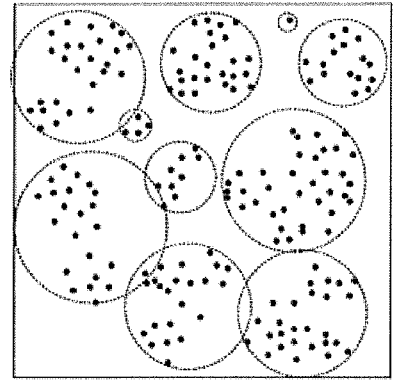
Figure 4D
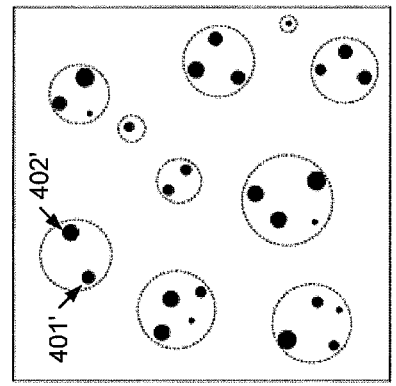
Figure 4C
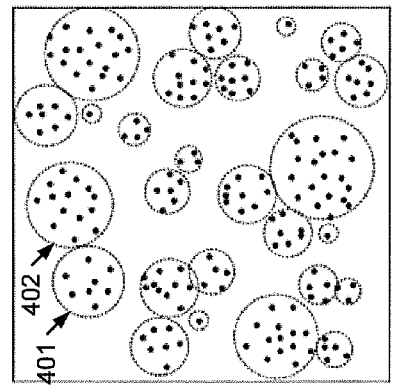
Figure 4B
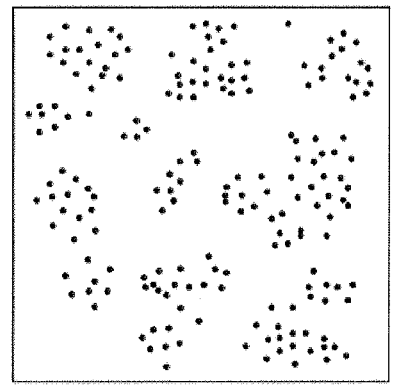
Figure 4A

SYSTEM AND METHOD FOR MALWARE CONTAINMENT IN COMMUNICATION NETWORKS

BACKGROUND OF THE INVENTION

1. Field of the Invention

The present invention relates to computers and computer networks. More particularly, the invention relates to containment of computer malware in a communication network.

2. Background of the Related Art

Personal communication devices (e.g., smart phones including both wired or wireless phones, personal computers installed with communication software such as Skype™, etc.) are becoming increasing sophisticated with significant content of computer software. While recent Internet worm challenges people with its ability of infecting thousands of computers within a few minutes, communication networks (e.g., a telephone network including both wired and wireless segments) become the next frontier for a new class of computer malware. For example, mobile worm exploits vulnerability of mobile communication devices (e.g., mobile phones or cellular phones) for propagation. Malware is software designed to infiltrate or damage a computing device (e.g., a communication device) without the owner's informed consent. Malware, also known as computer contaminant, includes computer viruses, worms, Trojan horses, rootkits, spyware, dishonest adware, and other malicious and unwanted software. One way for malware to propagate through a communication network is through the telephone messaging system such as the Multimedia Messaging Service (MMS) deployed in a cellular network.

Although techniques have been developed to defend against computer malware, there remains a need for techniques capable of automatic containing the propagation of malware in communication networks such as a cellular network.

SUMMARY

In general, in one aspect, the present invention relates to a method for containing propagation of a malware in a communication network having a plurality of communication nodes. The method steps include obtaining communication statistics from a traffic trace of the communication network, partitioning the communication network based on the communication statistics and a pre-determined criteria into at least a first portion of the communication network and a second portion of the communication network, identifying a separator node from the plurality of communication nodes, the separator node connecting the first portion of the communication network and the second portion of the communication network, and providing a security patch to the separator node for preventing propagation of the malware between the first portion of the communication network and the second portion of the communication network.

In general, in one aspect, the present invention relates to a method for containing propagation of a malware in a communication network having a plurality of communication nodes. The method steps include obtaining communication statistics from a traffic trace of the communication network, generating a weighted graph from the communication statistics to represent a communication pattern in the communication network, partitioning the weighted graph based on a pre-determined criteria into at least a first sub-graph representing a first portion of the communication network and a second sub-graph representing a second portion of the communication network, identifying a separator vertex from a plurality of vertices of the weighted graph, the separator vertex connecting the first sub-graph and the second sub-graph, the separator vertex representing a separator node of the plurality of communication nodes, and providing a security patch to the separator node for preventing propagation of the malware between the first portion of the communication network and the second portion of the communication network.

In general, in one aspect, the present invention relates to a computer readable medium, embodying instructions executable by the computer to perform method steps for containing propagation of a malware in a communication network having a plurality of communication nodes. The instructions include functionality for obtaining communication statistics from a traffic trace of the communication network, partitioning the communication network based on the communication statistics and a pre-determined criteria into at least a first portion of the communication network and a second portion of the communication network, identifying a separator node from the plurality of communication nodes, the separator node connecting the first portion of the communication network and the second portion of the communication network, and providing a security patch to the separator node for preventing propagation of the malware between the first portion of the communication network and the second portion of the communication network.

In general, in one aspect, the present invention relates to a computer readable medium, embodying instructions executable by the computer to perform method steps for containing propagation of a malware in a communication network having a plurality of communication nodes. The instructions include functionality for obtaining communication statistics from a traffic trace of the communication network, generating a weighted graph from the communication statistics to represent a communication pattern in the communication network, partitioning the weighted graph based on a pre-determined criteria into at least a first sub-graph representing a first portion of the communication network and a second sub-graph representing a second portion of the communication network, identifying a separator vertex from a plurality of vertices of the weighted graph, the separator vertex connecting the first sub-graph and the second sub-graph, the separator vertex representing a separator node of the plurality of communication nodes, and providing a security patch to the separator node for preventing propagation of the malware between the first portion of the communication network and the second portion of the communication network.

In general, in one aspect, the present invention relates to a system for containing propagation of a malware in a communication network having a plurality of communication nodes. The system includes a plurality of communication nodes communicatively coupled via the communication network and a server for malware containment operatively coupled to the communication network for collecting traffic traces of the communication network and disseminating security patches to one or more communication nodes of the plurality of communication nodes. The server includes a processor and memory comprising instructions executable by the processor. The instructions include functionality for obtaining communication statistics from the traffic traces of the communication network, partitioning the communication network based on the communication statistics and a pre-determined criteria into at least a first portion of the communication network and a second portion of the communication network, identifying a separator node from the plurality of communication nodes, the separator node connecting the first portion of the communication network and the second portion of the communication network, and providing the security patches to the separator node for preventing propagation of the malware between the first portion of the communication network and the second portion of the communication network.

In general, in one aspect, the present invention relates to a system for containing propagation of a malware in a communication network having a plurality of communication nodes. The system includes a plurality of communication nodes communicatively coupled via the communication network and a server for malware containment operatively coupled to the communication network for collecting traffic traces of the communication network and disseminating security patches to one or more communication nodes of the plurality of communication nodes. The server includes a processor and memory comprising instructions executable by the processor. The instructions include functionality for obtaining communication statistics from the traffic traces of the communication network, generating a weighted graph from the communication statistics to represent a communication pattern in the communication network, partitioning the weighted graph based on a pre-determined criteria into at least a first sub-graph representing a first portion of the communication network and a second sub-graph representing a second portion of the communication network, identifying a separator vertex from a plurality of vertices of the weighted graph, the separator vertex connecting the first sub-graph and the second sub-graph, the separator vertex representing a separator node of the plurality of communication nodes, and providing the security patches to the separator node for preventing propagation of the malware between the first portion of the communication network and the second portion of the communication network.

Other aspects and advantages of the invention will be apparent from the following description and the appended claims.

BRIEF DESCRIPTION OF DRAWINGS

FIGS. 3A-3C depict exemplary connectivity according to aspects of the invention.

FIGS. 4A-4D depict stages of an exemplary partition method according to aspects of the invention.

DETAILED DESCRIPTION

Figure 1:
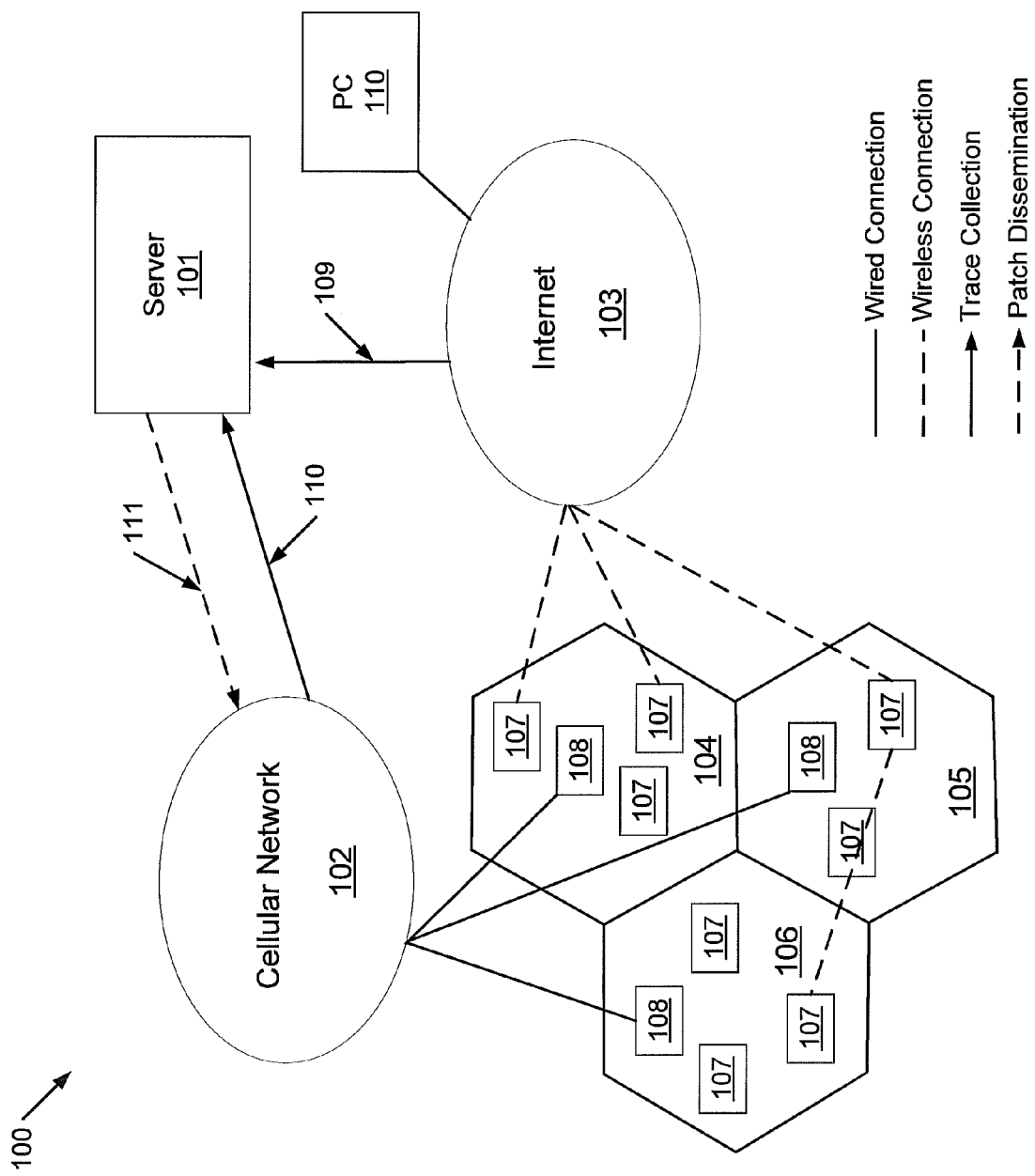
FIG. 1 shows a system block diagram for malware containment in an exemplary communication network according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

FIG. 1 shows a system block diagram for malware containment in an exemplary communication network according to aspects of the invention. Here, system (100) includes server (101), cellular network (102), Internet (103), and cellular zones (104), (105), (106). Each cellular zone has a base station (e.g., base station (108)) and may service a number of cellular phones (e.g., cellular phone (107)), which may also have access to the Internet (103), for example via the cellular network (102) or other broadband wireless services. As shown in FIG. 1, the cellular network (102) includes wired segments such as the link to base station (108) and wireless segments such as the link between base station (108) and cellular phone (107). Typically, the cellular phones communicate with each other using voice or data communications. Furthermore, computer nodes (e.g., PC (110)) may also communicate via Internet (103) with Internet-connected cellular phones (e.g., cellular phone (107)) or other computer nodes using voice or data communication capabilities provided by communication software such as Skype™. In the example of FIG. 1, a communication network may include a portion of the cellular network (102) and/or a portion of the Internet (103) made up with communication nodes such as the cellular phone (107) and/or computer node (110).

In general, the communication pattern among these communication nodes reflects social interactions and relations between users of these cellular phones and computer nodes. These social interactions and relations may be exploited by malware, for example using address book entries in the cellular phones or computer nodes to propagate through the communication network such as the exemplary communication network shown in FIG. 1. As the malware infects more communication nodes, a breakout occurs when the infection reaches certain threshold.

In one or more embodiments of the invention, security patches may be developed and disseminated to susceptible communication nodes to control the breakout. The communication nodes receiving the security patches become immune to the malware and could not be exploited to propagate the malware. In one or more embodiments of the invention, the security patches are disseminated to communication nodes with the highest risk to be infected or with highest probability to infect other communication nodes thus achieving efficient containment of the malware. In one or more embodiments of the invention, the communication network is partitioned and only the communication nodes separating these partitions are provided with the security patches such that the malware may be contained within infected partitions.

In one or more embodiments of the invention, server (101) is configured to collect communication traffic traces, for example via links (109) and (110). Typically, these traffic traces contain communication statistics of the communication pattern in the communication network. In one or more embodiments of the invention, a trace-driven weighted graph is constructed from the communication statistics of the collected traffic trace to represent the communication pattern. In one or more embodiments of the invention, the weighted graph is partitioned based on relationship information contained in the communication statistics. Furthermore, separator vertices in the weighted graph may then be identified that separated these partitions. The communication nodes corresponding to these separator vertices are called separator nodes. In one or more embodiments of the invention, server (101) is configured to disseminate security patches to these separator nodes. For example, push-based strategy may be used for disseminating the security patches. In this strategy, notifications of security patches may be sent to these separator nodes as soon as they become available. Upon receiving a notification, a user of these separator nodes authenticates and verifies the message in the notification and then accesses server (101) to download the notified security patch promptly. In one or more embodiments of the invention, server (101) includes distributed modules each configured to perform a portion of the tasks such as the trace collection, weighted graph generation/partition, security patch notification/dissemination, etc. In one or more embodiments of the invention, these tasks are performed by separate servers collectively represented as server (101) in FIG. 1.

In one or more embodiments of the invention, an exemplary weighted graph, in this case a cellular-relationship topology graph, of a communication network consisting of a cellular network with cellular phones (or "mobiles") is defined using the definition 1 described in TABLE 1 below to represent a communication pattern in the cellular network.

TABLE 1

Definition 1 (Cellular-Relationship Topology Graph): An undirected weighted graph G = (V, E) consists of a set of vertices V and a set of edges E, such that each vertex u ∈ V denotes a mobile in the cellular network, while each edge e(u, v) denotes that there has been a communication between mobile u and v. Let $d_u$ denote the degree of vertex u, u ∈ V (the number of vertices having a link with u). Let m(u, v) denote the number of weekly averaged traffic initiated from u to v. If there are functions f and g that map each vertex u ∈ V and each edge (u, v) ∈ E to a real number, than the graph is considered to be weighted with f and g determining the vertex-wights and edge-weights, respectively. The weight-mapping functions are as following:
$$f(u) = d_u \quad (1)$$
$$g(u, v) = m(u, v) + m(v, u) \quad (2)$$

Figures 2A, 2B, 2C:
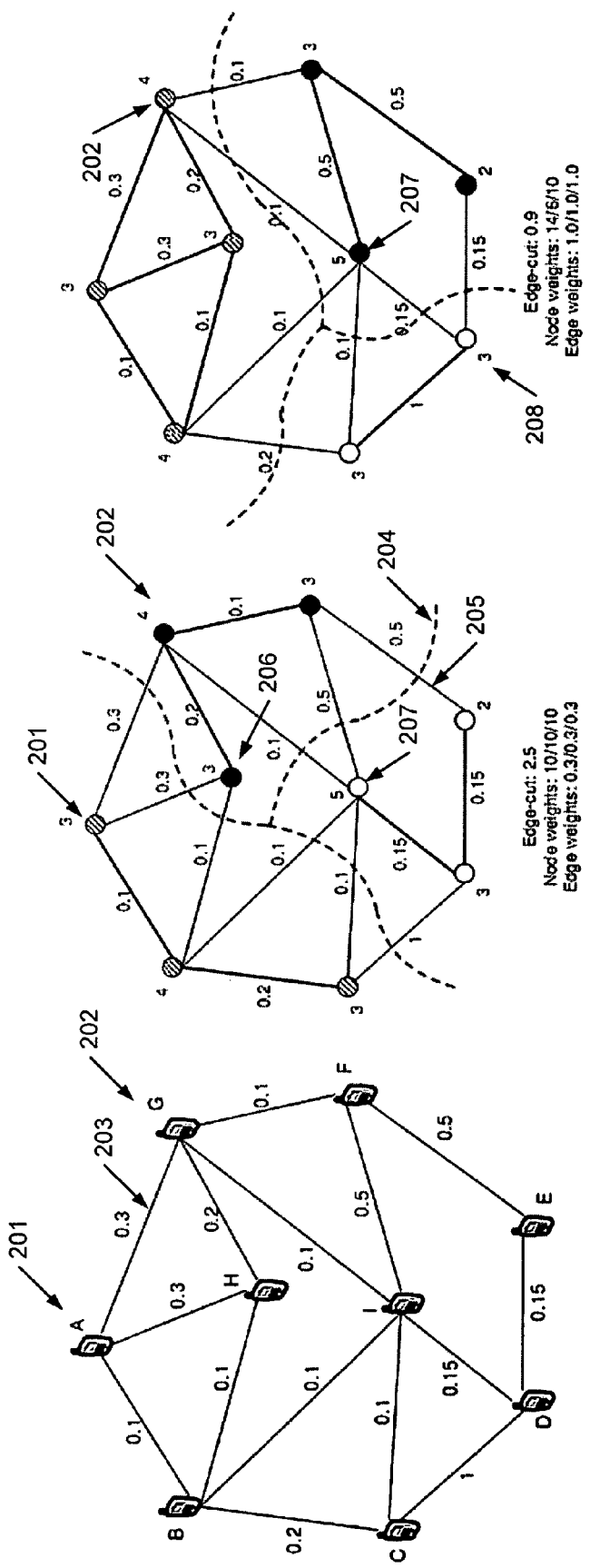
FIG. 2A depict an exemplary trace-driven weighted graph representing a communication pattern in a network according to aspects of the invention.
FIGS. 2B-2C depict exemplary partitions of the trace-driven weighted graph of FIG. 2A according to aspects of the invention.

In one or more embodiments, an example of relationship information of a communication network (e.g., made of communication nodes such as phones A through I) extracted from collected traffic traces is shown in TABLE 2 below. Here, each entry represents weekly averaged communication times (WACT) between two communication nodes (e.g., phones A, G, etc.). Based on this information, an exemplary weighted graph is constructed as shown in FIG. 2A to represent a communication pattern in the network. For example in FIG. 2A, vertex A (210) representing communication node "phone A" and vertex G (202) representing communication node "phone G" are linked using edge (203), which is associated with edge weight having a value of 0.3 according to the top entry of the right column in TABLE 1 where the WACT value of 3 between phones A and G is turned into the edge weight of 0.3 using an exemplary normalization factor of 10.

TABLE 2

COMMUNICATION TRAFFIC RECORDS

| Between Phones | WACT |
|---|---|
| A and B | 1 |
| A and G | 3 |
| A and H | 3 |
| B and C | 2 |
| B and H | 1 |
| B and I | 1 |
| C and D | 10 |
| C and I | 1 |
| D and E | 1.5 |
| D and I | 1.5 |
| E and F | 5 |
| F and G | 1 |
| F and I | 5 |
| G and H | 2 |
| G and I | 1 |

Each of FIGS. 2B and 2C shows essentially the same weighted graph as FIG. 2A where vertex labels A through I are omitted for clarity. In addition, the weighted graphs in FIGS. 2B and 2C include vertex weights. For example in FIG. 2B, vertex weight of vertex A (201) is shown as 3 according to the number of other vertices having a link with vertex A (201), which are vertices B, H, and G. Furthermore, FIGS. 2B and 2C depict partitions obtained using two different partition methods as examples where the partitions are separated by dash lines.

In one or more embodiments of the invention, the weighted graph representing a communication pattern in a communication network may be partitioned using the exemplary balanced graph partitioning method defined in TABLE 3 below:

TABLE 3

Definition 2 (Balanced Graph Partitioning): Given an undirected weighted graph G = (V, E), with weight f(i) for each vertex i ∈ V and g(u, v) for each edge (u, v) ∈ E, a partition P cuts the vertices set V into k(k > 1) subsets $V_1, V_2, ..., V_k$ such that $V_i \cap V_j = \phi$ for i ≠ j, and $U_i V_i = V$, with the following two constraints satisfied:
 the total vertice weights in each subset $V_i$ are balanced.
 the total weights of all edges crossing any two subsets is minimized.

The first constraint in the definition 2 requires the vertex weights for each partition to be balanced. With LoadImbalance(P) to denote the ratio of the highest partition weight over the average partition weight (i.e., $\max_i(f(V_i))/(f(V)/k)$), the first constraint minimizes LoadImbalance(P). This partitioning method tries to keep the vulnerability level in each partition balanced, so that the damage to each partition is balanced and limited. The second constraint keeps the edge weights between partitions minimized so that each partition is less related to each other to minimize infection from one partition to another. Let Edge-Cut(P) denote the total weights of all edges crossing any two partitions. Then, the second constraint minimizes Edge-Cut(P).

Existing graph partitioning algorithms have been developed for parallel computing to evenly distribute computations in a processor network by partitioning vertices of a weighted graph representing the processor network into equally weighted sets while minimizing inter-processor communication represented by edges crossing between partitions. These two objectives match the two constraints in the definition 2 above. Therefore, these existing graph partitioning algorithms may be used for the balanced graph partitioning method in one or more embodiments of the invention. FIG. 2A shows an example of three partitions separated by the dashed partitioning lines (e.g., the partition line (204)) obtained using the balanced graph partitioning method described above.

The balanced graph partitioning method attempts to keep the vulnerability level in each partition balanced, so that the damage to each partition is balanced and limited. This property is based on the assumption that malware are always successfully contained within individual partitions and malware propagation between any two partitions is not possible. However, this assumption may not hold under some scenarios. For example, if the weights of the edges across two partitions are very large, the malware propagation probability through this edge will be very high. Then, the malwares may have already propagated between the two partitions by the time security patches are developed and available for distribution.

In one or more embodiments of the invention, rather than always partitioning the graph into balanced parts, the weighted graph may also be partitioned according to the clustering relations in the communication pattern. This method is referred to as the clustered graph partitioning and is described in TABLE 4 below where edges within each partition have higher weights compared to the edges between two partitions.

TABLE 4

Definition 3 (Clustered Graph Partitioning): Given an undirected weighted graph G = (V, E), with weight f(i) for each vertex i ∈ V and g(u, v) for each edge (u, v) ∈ E, a partition P cuts the vertice set V into k(k > 1) subsets $V_1, V_2, ..., V_k$ such that $V_i \cap V_j = \phi$ for $i \neq j$, and $\cup_i V_i = V$, with the following two constraints satisfied:
    the averaged edge weights (i.e., the total edge weights divided by the number of nodes) in each subset $V_i$ are maximized: $\max(\Sigma_{m \in V_i, n \in V_i} g(m, n))/|V_i|$
    the total weights of all edges crossing subsets are minimized.

FIG. 2B shows an example of three partitions separated by the dashed partitioning line obtained using the clustered graph partitioning method. As can be seen in FIG. 2B, vertices representing communication nodes with close relationship to each other tend to stay in the same partition, while vertices representing communication nodes without close relationship tend to be assigned to different partitions. As described above, the rationale is that closer nodes are more likely to infect each other quickly when the malware breakout occurs. Since not much can be done effectively after the infection occurs before a security patch can be disseminated, closer nodes are preferably be left alone in the same partition. On the other hand, two nodes linked with a low weight link may have not communicated with each other from the time the malware breakout occurs and the time a security patch is disseminated and the probability for a malware to spread across the link is low. Therefore, keeping them in different partitions may effectively prevent the malware in one partition from infecting the other partition. Note that if there is no edge between two nodes, they will be assigned to two different partitions.

In one or more embodiments of the invention, a recursive partitioning algorithm based on connectivity may be used. The connectivity is defined in TABLE 5 below and are illustrated in FIGS. 3A-3C.

In one or more embodiments of the invention, a recursive partitioning algorithm defined based on the connectivity definition above is described in TABLE 6 below.

FIGS. 4A-4D depict the three stages defined in TABLE 6 above. As shown in FIG. 4A, the communication nodes in the network are depicted as dots forming various clusters in a weighted graph where edges are omitted for clarity. Instead, the distance between any two nodes in the weighted graph represents the weight of an omitted edge. FIG. 4B shows essentially the same weighted graph of FIG. 4A overlapped with various circles depicting partitions (e.g., partitions (401), (402), etc.) obtained by using, for example the method in the expanding stage described in TABLE 6. FIG. 4C depicts the partitions of FIG. 4B after the method in the contracting stage described in TABLE 6 is applied where each partition is depicted as a solid dot such as dots (401') and (402'), which correspond to partitions (401) and (402) of FIG. 4B. In addition, the circles in FIG. 4C depict partitions obtained using the methods in expanding stage and contracting stage recursively. FIG. 4D depict the final partition obtained, for example using the method in the restoring stage described in TABLE 6.

TABLE 5

Definition 4 (Connectivity): We define the connectivity C recursively as follows:
Connectivity between two nodes: If i and j are two nodes and the edge between them has a weight w(i, j), then the connectivity between node i and j is C(i, j) = w(i, j). If there is no edge between i and j, C(i, j) = 0.
Connectivity between a node and a set: S is a set with more than one node in it, and i is a node outside of S. Then the connectivity between node i and set S is C(i, S) = $\Sigma_{j \in S} C(i,j)$.
Connectivity between two sets: $S_1$ and $S_2$ are two sets in the graph, the connectivity between set $S_1$ and $S_2$ is $C(S_1, S_2) = \Sigma_{i \in S_1} C(i, S_2)$.
Connectivity of a set: The connectivity of set S is defined as the expected connectivity of any node i in the set S to the set $S_i$, $S_i$ is the set S excluding node i. Then C(S) =

$$\frac{\Sigma_{i \in S} C(i, S_i)}{n}$$, where n is the number of nodes in S.

The connectivity C denotes the connectivity level or closeness between two objects. For example, consider the closeness between a node i and a set S. Node i has one or more edges connected to set S, with weight $p_1, p_2, \ldots p_k$ respectively. As each edge weight $p_i$ denotes the probability that a message is successfully delivered from i to S through that particular edge i, then the probability that a message is successfully delivered from i to S can be computed by $1 - (1 - p_1)(1 - p_2) \ldots (1 - p_k)$. Ignoring the product items, it is simplified as $p_1 + p_2 + \ldots + p_k$, which is the connectivity C(i, S) between i and S.

Consider the connectivity of a set S. According to the definition of C(S), each edge weight in S would be counted twice. Therefore, the connectivity of S can also be presented as $C(S) = \frac{\Sigma_{i \in S, j \in S} 2w(i, j)}{n}$.

TABLE 6

1) Expanding Stage
    Sort all edges in graph G by their weight w. Pick the edge with the largest weight and put its two end nodes into one partition P.
    Partition P grows as following: for all neighboring nodes to this partition, choose the node i which has the largest connectivity with the partition P and add node i to form a new partition P'. Update C(P'). Repeat the above step on new partition P' until there are no neighboring nodes that make $C(P'') \geq C(P')$.
    Pick the edge with the largest weight from the rest of the edges and perform the above expanding process. The expanding stage stops when every node has been added to a partition.
2) Contracting Stage
    Based on the resulting partitions from the expanding stage, contract G to a condensed graph G' such that each partition $P_i$ in G become a node i in G' and all the interconnection edges between two partitions $P_i$ and $P_j$ become an edge e(i, j) between the two corresponding nodes i and j in G'. w(i, j) = $C(P_i, P_j)$.
    Recursively apply Expanding stage and Contracting stage on graph G', which stops when the number of partitions falls below the specified value k.
3) Restoring Stage
    Restore the original graph G by replacing each condensed node in each partition with its original nodes in the corresponding partition created in the contracting stage. Then, graph G is cut into less than k partitions.

The basic idea of this recursive algorithm is to enlarge each partition from individual nodes based on the metric of connectivity. As described above, starting with a seed partition including two end nodes of the highest weight edge of the weighted graph, repeatedly a new node with the largest connectivity with the current partition is chosen and added to the partition. This process stops until joining by any additional node does not further increase the connectivity of the partition. This process then repeats with another seed partition based on the highest weight edge left outside of the partitions. When there is no more edges left outside of the partitions, the graph has been partitioned to clusters and the entire process is called a round. A new round is then started if the number of partitions is larger than a predetermined count k. The new round starts with each partition contracted to a node and the partition expanding process is performed on the contracted graph.

The time complexity of this recursive partitioning algorithm can be analyzed below. At the beginning, there are n nodes in the weighted graph, which can be viewed as n individual partitions. At the end, the number of partitions is lower than k. As each partition expanding includes at lease one node or one subset into a partition, there are at most n–k times of partition expanding. For each partition expanding, a node with largest connectivity with the partition is searched. This takes time $O(n_p*C)$, where $n_p$ is the number of nodes in the current partition and C is the average degree of each node. In the worst case, the partition is as large as the entire graph and $n_p$ becomes n. Therefore, the total time for the algorithm is $O(n^2)$.

In one or more embodiments of the invention, a separator vertex from the vertices of the weighted graph representing a communication pattern in the network can be identified after the partitioning using any of the above described methods or other appropriate partitioning methods. In one or more embodiments of the invention, the separator vertex can be identified using the method described in TABLE 7 below.

TABLE 7

Algorithm 1 Minimum Vertex Separator Algorithm

Figure 5:
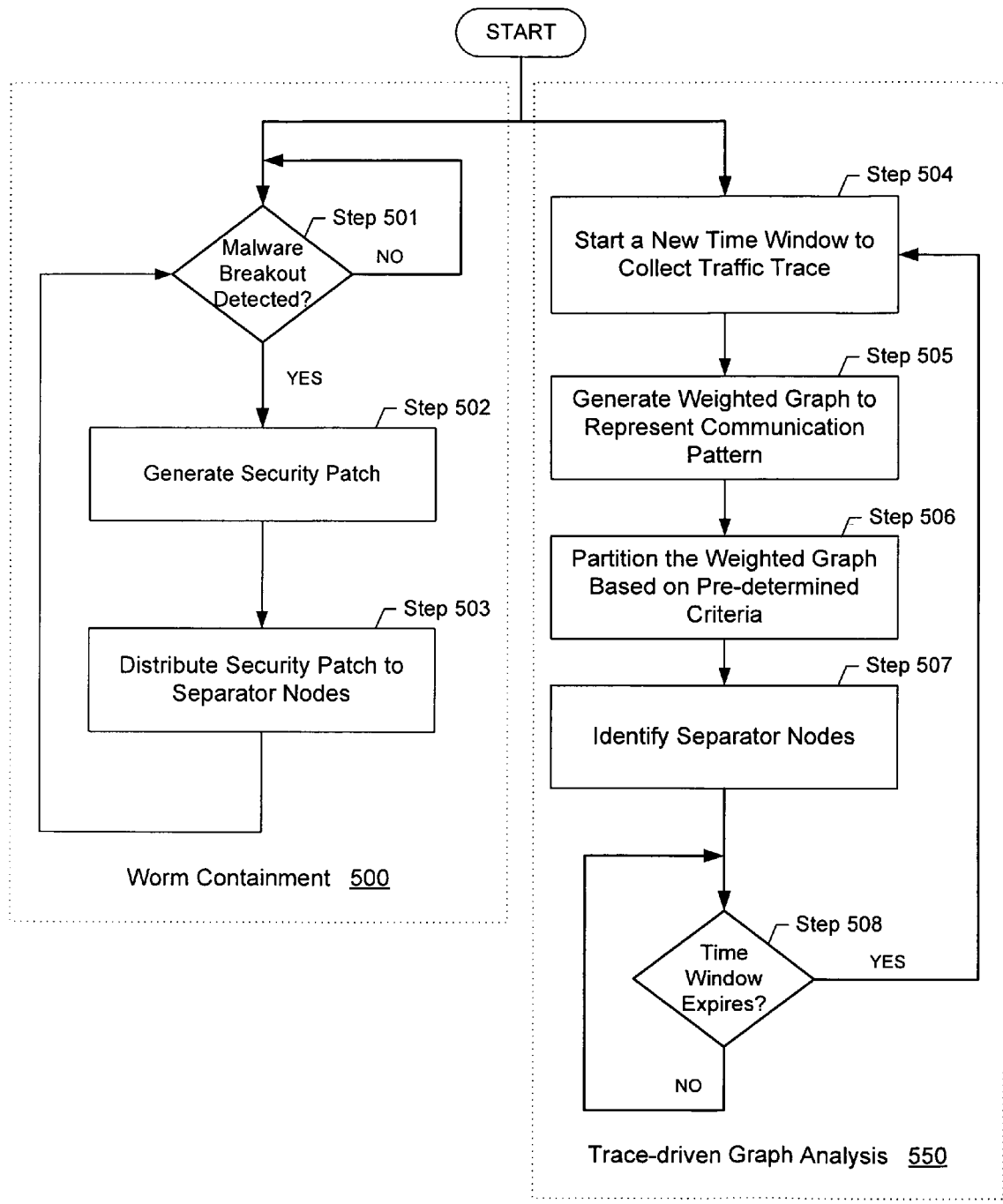
FIG. 5 shows a flow chart of a method according to aspects of the invention.

Input: $E_C$: the set of cut edges;
1:    $V_S \leftarrow \phi$
2:    while $E_C \neq \phi$ do
3:       Select $v \in V'$ which is shared by the most number of cut edges in $E_C$
4:       Add v to $V_S$
5:       Remove from $E_C$ any cut edge whose end point is v
6:    end while
Output: $V_S$: the set of vertex separators;

FIG. 5 shows a flow chart of a method according to aspects of the invention. The method may be practiced in, for example system (100) described with respect to FIG. 1. As shown in FIG. 5, the method includes two independent processes (500) and (550). In the process (500) labeled as "Worm Containment", a decision is made repeatedly as to whether a malware breakout is detected (Step 501). Once a malware breakout is detected, a security patch is generated (Step 502) and distributed to separator nodes (Step 503), which are determined from another process loop (550) described below. There are many ways known to one skilled in the art as to how the malware may be detected and how the security a patch may be generated and distributed.

Further as shown in FIG. 5, in the process (550) labeled as "Trace-driven Graph Analysis", a new time window is started repeatedly to collect communication network traffic traces (Step 504). In each time window, a weighted graph is constructed from the collected traffic trace to represent a communication pattern in the network (Step 505). The weighted graph may be generated, for example in the manner described with respect to FIG. 2A, TABLE 1, and TABLE 2 above. Once the weighted graph is generated, it is partitioned based on a pre-determined criteria, such as implemented using the algorithms described with respect to FIG. 2B, FIG. 2C, FIG. 3D, TABLE 3, TABLE 4, TABLE 5, and TABLE 6 above. With the partitioned graph, separator nodes in the communication network corresponding to separator vertices in the weighted graph may then be identified (Step 507) using, for example the algorithm described with respect to TABLE 7 above. The identified separator nodes point to the communication nodes (e.g., cellular phones or computer nodes in the communication network) that are candidates to receive security patches once malware breakout is detected in the process (500). Furthermore, once a pre-determined duration of the time window expires (Step 508), new traffic traces are collected in another new time window (Step 504).

Embodiments of the invention may be implemented on virtually any type of computer regardless of the platform being used. For example, a computer system may include one or more processor(s), associated memory (e.g., random access memory (RAM), cache memory, flash memory, etc.), a storage device (e.g., a hard disk, an optical drive such as a compact disk drive or digital video disk (DVD) drive, a flash memory stick, etc.), and numerous other elements and functionalities typical of today's computers. The computer may also include input means, such as a keyboard, a mouse, or a microphone. Further, the computer may include output means, such as a monitor (e.g., a liquid crystal display (LCD), a plasma display, or cathode ray tube (CRT) monitor). The computer system may be connected to a network (e.g., a local area network (LAN), a wide area network (WAN) such as the Internet, or any other similar type of network) with wired and/or wireless segments via a network interface connection. Those skilled in the art will appreciate that many different types of computer systems exist, and the aforementioned input and output means may take other forms. Generally speaking, the computer system includes at least the minimal processing, input, and/or output means necessary to practice embodiments of the invention.

Further, those skilled in the art will appreciate that one or more elements of the aforementioned computer system may be located at a remote location and connected to the other elements over a network. Further, embodiments of the invention may be implemented on a distributed system having a plurality of nodes, where each portion of the invention (e.g., report generator, event manager, user application, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

It will be understood from the foregoing description that various modifications and changes may be made in the preferred and alternative embodiments of the present invention without departing from its true spirit. For example, although the examples given above relates to a cellular phone network, the invention may be applied to other network known to one skilled in the art or may be available in the future where communication patterns exist that reflect user relationships. Furthermore, the format of the weighted graph, the partitioning algorithms used, the algorithm to identify separator vertices, etc. may be supplemented by variations of the examples described or include subset or superset of the examples given above, the method may be performed in a different sequence, the components provided may be integrated or separate, the devices included herein may be manually and/or automatically activated to perform the desired operation. The activation (e.g., performing traffic trace collection, weighted graph generation, partitioning, separator vertices identification, malware detection, security patch generation and dissemination, etc.) may be performed as desired and/or based on data generated, conditions detected and/or analysis of results from the network traffic.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method for containing propagation of a malware in a communication network having a plurality of communication nodes, comprising:

obtaining communication statistics from a traffic trace of the communication network;

generating, by a hardware server, a weighted graph from the communication statistics to represent a communication pattern in the communication network, wherein the weighted graph comprises a plurality of vertices representing the plurality of communication nodes and a plurality of edges connecting the plurality of vertices, wherein each vertex of the plurality of vertices is associated with a vertex weight, the vertex weight being determined from a portion of the communication statistics associated with a corresponding communication node of the plurality of communication nodes, wherein each edge of the plurality of edges is associated with an edge weight, each edge connecting two communication nodes of the plurality of communication nodes, the edge weight being determined from a portion of the communication statistics associated with communication between the two communication nodes;

partitioning, by the hardware server, the weighted graph based on a first pre-determined criterion into at least a first sub-graph representing a first portion of the communication network and a second sub-graph representing a second portion of the communication network, wherein the first sub-graph comprises a first portion of the plurality of vertices and the second sub-graph comprises a second portion of the plurality of vertices wherein the weighted graph is partitioned based on the first pre-determined criterion such that a first sum of vertex weight associated with the first portion of the plurality of vertices is essentially the same as a second sum of vertex weight associated with the second portion of the plurality of vertices;

identifying, by the hardware server, one or more separator edges of the plurality of edges, the one or more separator edges connecting the first sub-graph and the second sub-graph, wherein the weighted graph is partitioned based on the first pre-determined criterion such that a sum of edge associated with the one or more separator edges is minimized;

identifying, by the hardware server, a separator vertex from the plurality of vertices of the weighted graph, the separator vertex connecting the first sub-graph and the second sub-graph, the separator vertex representing a separator node of the plurality of communication nodes; and providing a security patch to the separator node for preventing propagation of the malware between the first portion of the communication network and the second portion of the communication network.

2. The method of claim 1, wherein the separator node is identified on a periodic basis, and wherein the security patch is provided based on a second pre-determined criterion of malware infection of the communication network.

3. The method of claim 1, further comprising:

providing the security patch from the separator node to at least one portion of the communication network selected from a group consisting of the first portion of the communication network and the second portion of the communication network, wherein the separator node is comprised in the at least one portion of the communication network.

4. The method of claim 1, wherein the weighted graph is partitioned based on the first pre-determined criterion using a recursive algorithm with execution time of an order $O(n^2)$ where n represents a vertex count of the plurality of vertices.

5. A method for containing propagation of a malware in a communication network having a plurality of communication nodes, comprising:

obtaining communication statistics from a traffic trace of the communication network;

generating a weighted graph from the communication statistics to represent a communication pattern in the communication network, wherein the weighted graph comprises a plurality of vertices representing the plurality of communication nodes and a plurality of edges connecting the plurality of vertices, wherein each edge of the plurality of edges is associated with an edge weight, each edge connecting two communication nodes of the plurality of communication nodes, the edge weight being determined from a portion of the communication statistics associated with communication between the two communication nodes, partitioning the weighted graph based on a first pre-determined criterion into at least a first sub-graph representing a first portion of the communication network and a second sub-graph representing a second portion of the communication network, wherein the first sub-graph comprises a first portion of the plurality of vertices and a first portion of the plurality of edges, wherein a first averaged edge weight is determined from a first sum of edge weight associated with the first portion of the plurality of edges divided by a first number of vertices associated with the first portion of the plurality of vertices, wherein the second sub-graph comprises a second portion of the plurality of vertices and a second portion of the plurality of edges, wherein a second averaged edge weight is determined from a second sum of edge weight associated with the second portion of the plurality of edges divided by a second number of vertices associated with the second portion of the plurality of vertices, wherein the weighted graph is partitioned based on the first pre-determined criterion such that the first averaged edge weight and the second averaged edge weight are simultaneously maximized;

identifying a separator vertex from the plurality of vertices of the weighted graph, the separator vertex connecting the first sub-graph and the second sub-graph, the separator vertex representing a separator node of the plurality of communication nodes; and providing a security patch to the separator node for preventing propagation of the malware between the first portion of the communication network and the second portion of the communication network.

6. The method of claim 5, further comprising:
identifying one or more separator edges of the plurality of edges, the one or more separator edges connecting the first sub-graph and the second sub-graph,
wherein the weighted graph is partitioned based on the first pre-determined criterion such that a sum of edge weight associated with the one or more separator edges is minimized.

7. The method of claim 5,
wherein the separator node is identified on a periodic basis, and
wherein the security patch is provided based on a second pre-determined criterion of malware infection of the communication network.

8. The method of claim 5, further comprising:
providing the security patch from the separator node to at least one portion of the communication network selected from a group consisting of the first portion of the communication network and the second portion of the communication network, wherein the separator node is comprised in the at least one portion of the communication network.

9. A non-transitory computer readable medium, embodying instructions executable by a computer to perform method steps for containing propagation of a malware in a communication network having a plurality of communication nodes, the instructions comprising functionality for:
obtaining communication statistics from a traffic trace of the communication network;
generating a weighted graph from the communication statistics to represent a communication pattern in the communication network, wherein the weighted graph comprises a plurality of vertices representing the plurality of communication nodes and a plurality of edges connecting the plurality of vertices, wherein each vertex of the plurality of vertices is associated with a vertex weight, the vertex weight being determined from a portion of the communication statistics associated with a corresponding communication node of the plurality of communication nodes, wherein each edge of the plurality of edges is associated with an edge weight, each edge connecting two communication nodes of the plurality of communication nodes, the edge weight being determined from a portion of the communication statistics associated with communication between the two communication nodes;
partitioning the weighted graph based on a first pre-determined criterion into at least a first sub-graph representing a first portion of the communication network and a second sub-graph representing a second portion of the communication network, wherein the first sub-graph comprises a first portion of the plurality of vertices and the second sub-graph comprises a second portion of the plurality of vertices wherein the weighted graph is partitioned based on the first pre-determined criterion such that a first sum of vertex weight associated with the first portion of the plurality of vertices is essentially the same as a second sum of vertex weight associated with the second portion of the plurality of vertices;
identifying one or more separator edges of the plurality of edges the one or more separator edges connecting the first sub-graph and the second sub-graph, wherein the weighted graph is partitioned based on the first pre-determined criterion such that a sum of edge weight associated with the one or more separator edges is minimized;
identifying a separator vertex from the plurality of vertices of the weighted graph, the separator vertex connecting the first sub-graph and the second sub-graph, the separator vertex representing a separator node of the plurality of communication nodes; and
providing a security patch to the separator node for preventing propagation of the malware between the first portion of the communication network and the second portion of the communication network.

10. The non-transitory computer readable medium of claim 9,
wherein the separator node is identified on a periodic basis, and
wherein the security patch is provided based on a second pre-determined criterion of malware infection of the communication network.

11. The non-transitory computer readable medium of claim 9, the instructions further comprising functionality for:
providing the security patch from the separator node to at least one portion of the communication network selected from a group consisting of the first portion of the communication network and the second portion of the communication network, wherein the separator node is comprised in the at least one portion of the communication network.

12. A system for containing propagation of a malware in a communication network having a plurality of communication nodes, comprising:
a plurality of communication nodes communicatively coupled via the communication network; and
a server for malware containment operatively coupled to the communication network for collecting traffic traces of the communication network and disseminating security patches to one or more communication nodes of the plurality of communication nodes, the server comprising:
a processor; and
memory comprising instructions executable by the processor, the instructions comprising functionality for:
obtaining communication statistics from a traffic trace of the communication network;
generating a weighted graph from the communication statistics to represent a communication pattern in the communication network, wherein the weighted graph comprises a plurality of vertices representing the plurality of communication nodes and a plurality of edges connecting the plurality of vertices, wherein each vertex of the plurality of vertices is associated with a vertex weight, the vertex weight being determined from a portion of the communication statistics associated with a corresponding communication node of the plurality of communication nodes, wherein each edge of the plurality of edges is associated with an edge weight, each edge connecting two communication nodes of the plurality of communication nodes, the edge weight being determined from a portion of the communication statistics associated with communication between the two communication nodes;
partitioning the weighted graph based on a first pre-determined criterion into at least a first sub-graph representing a first portion of the communication network and a second sub-graph representing a second portion of the communication network, wherein the first sub-graph comprises a first portion of the plurality of vertices and the second sub-graph comprises a second portion of the plurality of vertices wherein the weighted graph is partitioned based on the first pre-determined criterion such that a first sum of vertex weight associated with the first portion of the plurality of vertices is essentially the same as a second sum of vertex weight associated with the second portion of the plurality of vertices;

identifying one or more separator edges of the plurality of edges, the one or more separator edges connecting the first sub-graph and the second sub-graph, wherein the weighted graph is partitioned based on the first pre-determined criterion such that a sum of edge weight associated with the one or more separator edges is minimized;

identifying a separator vertex from the plurality of vertices of the weighted graph, the separator vertex connecting the first sub-graph and the second sub-graph, the separator vertex representing a separator node of the plurality of communication nodes; and providing a security patch to the separator node for preventing propagation of the malware between the first portion of the communication network and the second portion of the communication network.

13. The system of claim 12, wherein the separator node is identified on a periodic basis, and wherein the security patch is provided based on a second pre-determined criterion of malware infection of the communication network.

14. The system of claim 12, the instructions further comprising functionality for:

providing the security patch from the separator node to at least one portion of the communication network selected from a group consisting of the first portion of the communication network and the second portion of the communication network, wherein the separator node is comprised in the at least one portion of the communication network.

\* \* \* \* \*